United States Patent [19]

Slana

[11] 3,725,614

[45] Apr. 3, 1973

[54] COMMUNICATION ARRANGEMENT ALLOWING NETWORK PATH TESTING

[75] Inventor: Matthew Francis Slana, Naperville, Ill.

[73] Assignee: Bell Telephone Laboratories, Incorporated, Murray Hill, N.J.

[22] Filed: Apr. 13, 1971

[21] Appl. No.: 133,666

[52] U.S. Cl. ............................................179/175.2 R

[51] Int. Cl. ...............................................H04m 3/08

[58] Field of Search .....179/175.23, 175.25, 175.2 R; 328/115, 116; 178/69 R, 69 A

[56] References Cited

UNITED STATES PATENTS

| | | | |
|---|---|---|---|
| 3,555,208 | 1/1971 | Arndt | 179/175.23 |
| 3,505,475 | 4/1970 | Carbone et al. | 178/69 R |
| 3,436,479 | 4/1969 | Houcke et al. | 178/69 R |

*Primary Examiner*—Kathleen H. Claffy
*Assistant Examiner*—Douglas W. Olms
*Attorney*—R. J. Guenther and R. B. Ardis

[57] ABSTRACT

Terminating circuits for a switching network provide crosspoint bias current, pulse transfer, and path testing. Pulse transfer occurs by allowing the bias current to represent one binary value and increasing the current to a second level for the other binary value. When the second level is N times the bias level, $1<N<3$, and the detection circuitry only responds to currents above a threshold level of X times the bias current, where $N + 1/2 \leq X < N$ for $1 < N \leq 2$, and $N + 1/2 \leq N < 2$ for $2 < N < 3$, discontinuities, grounds, and crosses to other paths can be detected by sequentially applying two complementary binary test input signals to an input circuit and observing the responses thereto at the connected output circuit.

10 Claims, 2 Drawing Figures

INVENTOR
M. F. SLANA
BY John C. Albrecht
ATTORNEY

COMMUNICATION ARRANGEMENT ALLOWING NETWORK PATH TESTING

BACKGROUND OF THE INVENTION

This invention relates to terminating circuits for transmitted digital information across switching networks employed in communication switching systems.

A switching network is employed to selectively interconnect the input and output terminals thereof over individual electrically isolated paths. In order to enhance the probability of error-free transmission, these network paths are tested at the time they are established to insure integrity of the path by verifying that the path is free from discontinuities, grounds, and crosses to other paths.

Prior communication switching systems incorporating such path checking features have used special network access ports, or special pulsing and detection circuitry, or both. This special circuitry has taken the form of both common circuitry, switched to network terminations as needed, and individual circuits dedicated to each network termination. In such arrangements, test signals are applied at one point and the presence or absence of these test signals at another predetermined point is observed.

Certain semiconductor switching networks must be operated with a bias current resident on each established path. These networks have thyristor or PNPN crosspoints which cease to be conductive if the current therethrough falls below a certain level, called the bias level. Such networks transmit digital information using input and output terminating circuits for applying binary pulses at an input of the network and detecting these pulses at a connected output. Terminating circuits of this type are disclosed in a copending application, Ser. No. 89,599, filed Nov. 16, 1970 (R.R. Laane Case 3).

Accordingly, it is an object of this invention to simplify facilities for testing network paths.

SUMMARY OF THE INVENTION

In accordance with this invention, a plurality of input circuits, each connected to a corresponding one of a plurality of network input terminals, is provided for the generation of pulses, and a plurality of output circuits, each connected to a corresponding one of a plurality of network output terminals, is provided for the detection of pulses. Each input circuit is responsive to binary signals applied thereto for the generation at the corresponding input terminal of corresponding current signals of first and second predetermined magnitudes representing the two input values respectively, the second predetermined magnitude being N times the first predetermined magnitude where N is greater than one and less than three. Also, the first predetermined magnitude must be at least equal to the bias current level required to keep the network crosspoints conductive. Thus, a distinct current level is established in a network path by the corresponding input circuit to represent each input signal state.

Each of the output circuits generates a data output signal in response to current signals obtained from the connected output terminal which exceed a predetermined threshold level of X times the first predetermined magnitude, where $(N + 1)/2 \leq X < N$ for $1 < N \leq 2$, and $(N + 1)/2 \leq X < 2$ for $2 < N < 3$. The design of the input and output circuits is such as to satisfy these relationships.

These relationships advantageously allow any network path to be exhaustively tested by applying two complementary test binary inputs in sequence, e.g., a binary "0" and then a binary "1," to an input circuit and observing the resulting responses at the connected output circuit. These test inputs are similar to, but of longer duration than, normal information bits. Detection of discontinuities and grounds, in the path between the selected input and output terminals and of crosses to other paths are thereby accomplished.

In accordance with one feature of this invention, network path testing is accomplished with the same terminating circuitry that is used to supply bias current for the network crosspoints, and to apply and detect pulses at the network input and output terminals, respectively. Advantageously, these arrangements eliminate the need for special path testing circuitry and network access ports.

In accordance with another feature of this invention, the application of two complementary binary test inputs to an input circuit and the observation of the response thereto at the connected output circuit permits the detection of discontinuities, grounds, and crosses to other paths. This advantageously simplifies the path testing procedure.

BRIEF DESCRIPTION OF THE DRAWING

This invention will be clearly understood from the following description of the illustrative embodiment when read with respect to the drawing wherein.

DETAILED DESCRIPTION

Figure 1:
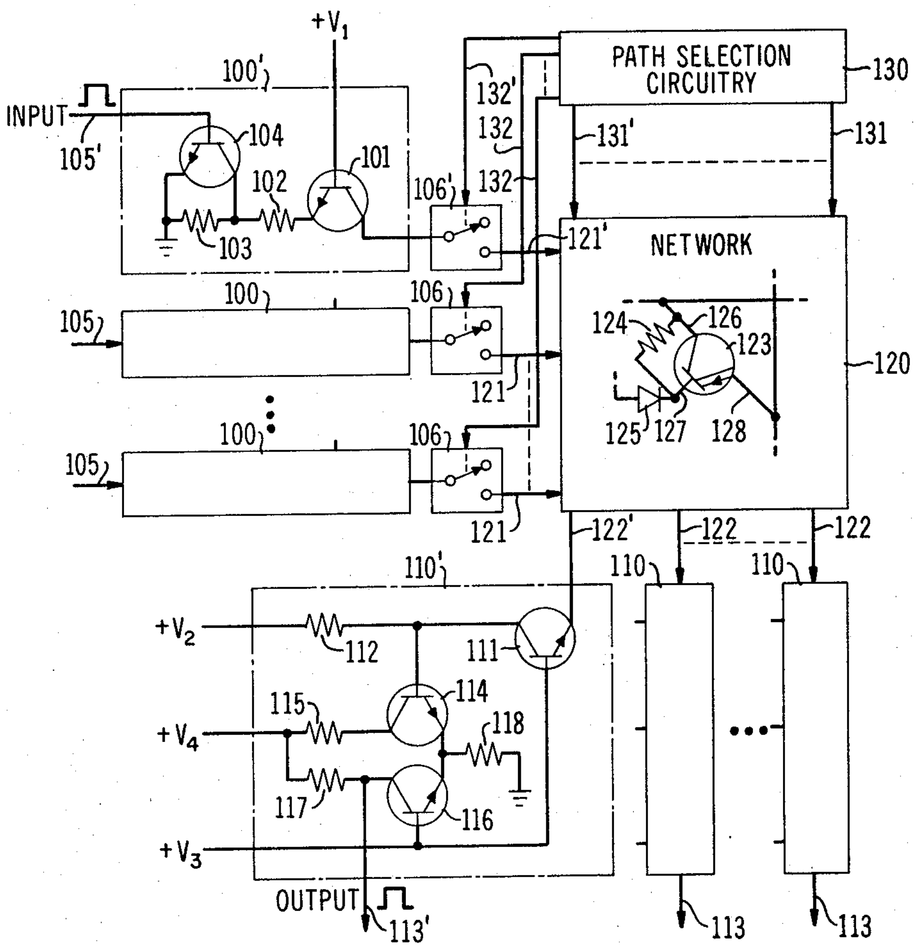
FIG. 1 depicts an illustrative communication arrangement.

The details of the Switching Network 120 are not shown in FIG. 1 since they are not required for an understanding of my invention. Basically, the network comprises a plurality of crosspoints arranged in one or more interconnecting matrices terminating in a plurality of Network Input Terminals 121 and a plurality of Network Output Terminals 122, with any network input terminal selectively connectable to any network output terminal. Shown in FIG. 1 is a representative semiconductor crosspoint consisting of a PNPN or Thyristor 123, its Anode 128 and Cathode 126 connected between horizontal and vertical conductors of the matrix. A Resistor 124 is connected between the Cathode 126 and the Gate 127 of the thyristor to increase protection against false "turn on" due to transient voltages, and a Diode 125 is connected between the Gate 127 and the Path Selection Circuitry 130 for isolation. The Path Selection Circuitry 130 establishes network paths by energizing selected crosspoints on an XY coordinate basis. For example, to interconnect a specified Input Terminal 121' and a specified Output Terminal 122' Lead 131', which is connected to the Gates 127 of all thyristors which are connected to Output Terminal 122', is pulsed. Simultaneously, a bias current sufficient to keep the thyristors conductive is established on Input Terminal 121′ by closing Switch 106′. Although Switch 106′ is shown as an electromechanical switch in FIG. 1, it is understood that it may be any of the well-known electromechanical or electronic switches along with appropriate operating circuitry responsive to closure signals generated on Line 132′ by the Path Selection Circuitry 130. The bias current thus established is available for all thyristors connected to Input Terminal 121′ and the gating pulse is available for all thyristors connected to Output Terminal 122′. However, since only one thyristor is connected to both, only that one will be energized. After the gating pulse is removed, the bias current will keep the selected thyristor conductive until Switch 106′ is opened at a later time.

A plurality of Input Circuits 100 is shown in FIG. 1, each connected to a corresponding one of the plurality of Input Terminals 121. In the representative Input Circuit 100′, the Transistor 101 operates in the emitter follower mode with its collector connected to an Input Terminal 121′ through a Switch 106′, its base connected to a source of constant voltage $V_1$ and its emitter connected to ground through two series Resistors 102 and 103. Transistor 101 acts as a constant current source generating a current I at the Input Terminal 121′. The current $I = V_1 - V_{BE}/R_{emitter}$, where $V_{BE}$ is the base-to-emitter junction voltage of Transistor 101 and $R_{emitter}$ is the total resistance between the emitter and ground. A second Transistor 104 is employed to shunt Resistor 103, thereby reducing $R_{emitter}$ and shifting the current level at the Input Terminal 121′. Binary input signals are applied to the base of this Transistor 104 via Input Line 105′. The magnitudes of these signals are sufficient to saturate the Transistor 104 for one binary state and not sufficient for the other state. Thus, the input signals modulate the current generated by the current source Transmitter 101 to provide at the Input Terminal 121′ a current $I_1$, representing a binary "0," where $I_1 = (V_1 - V_{BE})/$(Resistor 102 + Resistor 103), and a current $I_2$, representing a binary "1," where $I_2 = (V_1 - V_{BE} - V_{CE})/$Resistor 103, $V_{CE}$ being the saturation collector-to-emitter junction voltage of Transistor 104. The current source Transistor 101, the Emitter Resistors 102 and 103, and $V_1$ are chosen so that $I_1$ is at least equal to the bias current required by the thyristor crosspoints.

Also shown in FIG. 1 is a plurality of Output Circuits 110, each connected to one of a plurality of Network Output Terminals 122. In the representative Output Circuit 110′ the Transistor 111 operates in the common base mode with the emitter connected directly to the Output Terminal 122′, the base connected to a source of constant voltage $V_3$ and the collector connected to a source of constant voltage $V_2$ through a Resistor 112. The current $I$ generated at the Input Terminal 121′ by the Input Circuit 100′ is transmitted through the thyristor network to the Output Terminal 122′ where it forms the emitter current of Transistor 111. In the common base configuration the collector current of the Transistor 111 is essentially equivalent to its emitter current. The magnitude of this collector current is then either essentially $I_1$ or $I_2$, depending on the state of the binary input being applied to the Input Line 105′. As the current is increased from $I_1$ to $I_2$, the voltage at the collector of the Transistor 111 will decrease, since this voltage $V_C$ is determined by the equation $V_C = V_2 - R_L I$, where $R_L$ is the resistance of the Load Resistor 112 and $I$ is the magnitude of the current being generated by the Input Circuit 100′, either $I_1$ or $I_2$. The values of the elements of the Input Circuit 100′ are chosen so that a current of magnitude $I_2$ will create a sufficient voltage drop across Resistor 112 to cause $V_C$ to be less than $V_3$, thereby saturating Transistor 111.

A differential comparator is included in the Output Circuit 110′ to recognize the occurrence of saturation by detecting the resulting reversal of polarity of the collector-to-base junction voltage of the Transistor 111. The differential comparator consists of Transistors 114 and 116 whose emitters are connected together and tied to ground through a Resistor 118 and whose collectors are each connected to a source of constant voltage $V_4$ through Load Resistors 115 and 117 respectively. The base of Transistor 114 is connected to the collector of Transistor 111 and the base of Transistor 116 is connected to the base of Transistor 111. Corresponding output signals for the saturated and nonsaturated states of Transistor 111 appear on Output Line 113′, connected to the collector of Transistor 116. The operation of differential comparators is well known in the art and will not be described in greater detail here. It should be recognized that the described embodiment of a method for detecting saturation is illustrative only and that many other methods of doing this are well known in the art and can be employed in conjunction with the invention.

The values of the elements of the Output Circuit 110′ are selected to satisfy the following relationship: For a current $I_2$, N times the current $I_1$, where $1 < N < 3$, the Transistor 111 will saturate if its collector current exceeds a threshold level of X times the magnitude of $I_1$, where $(N + 1)/2 \leq X < N$ for $1 < N \leq 2$, and $(N+1)/2 \leq X < 2$ for $2 < N < 3$.

A typical selected network path involves a connection between a single Network Input Terminal 121 and a single Network Output Terminal 122, established in response to signals from the Path Selection Circuitry 130. However, malfunctions in the Path Selection Circuitry 130 or in the Network 120 itself can result in discontinuities, crosses, or grounds which interfere with communication over the path. Path testing in accordance with my invention can be understood by considering the effects of such malfunctions.

First, discontinuities may exist between the selected input terminal and the selected output terminal. Included in the definition of a discontinuity is a complete path connecting the selected input terminal with an unselected output terminal of vice versa. In either case, the discontinuity prevents any current flow between the selected terminals and, therefore, there can be no detection of the increased current $I_2$ associated with a "1" input.

Second, a ground on the selected path will prevent any changes in the current generated at the input circuit from effecting the current detected at the output circuit. If the output circuit itself generates sufficient current to saturate Transistor 111, then a constant "1" output will be provided. If not, there will be a constant "0" output independent of the state of the input signal at the input circuit.

Third, crosses may be of three types. When there is a cross between the selected path and another output terminal not presently associated with any path, the increased current $I_2$ generated by the single input circuit will divide equally between the two output circuits. Since $I_2 = NI_1$ each output circuit will only see a current of $N/2\ I_1$. An output circuit is only responsive to currents exceeding $(N + 1)/2\ I_1$ and, therefore, the proper output signal will not be present.

If there is a cross between the selected path and another input terminal not presently associated with any path, its corresponding Switch 106 will not have been closed. Since there is no connection to its current source, there will be no interference with communication over the selected path until this second input circuit is later connected into a path. When that happens, there will be a cross to another complete path rather than to a second input circuit alone.

Finally, consider crosses to a second complete path. Assume first that the second input circuit is transmitting a "0," represented by the current $I_1$. When a "0" test signal is applied to the selected input circuit, the total current of $2I_1$, being $I_1$ from each of the two input circuits, divides equally between the two output circuits to supply $I_1$ to each. This is insufficient to saturate the selected output circuit, which responds only to currents exceeding a threshold of $(N + 1)/2\ I_1$. When a "1" test signal is applied to the selected input circuit, the total current is $(N + 1)\ I_1$, $NI_1$ from the selected input circuit and $I_1$ from the unselected input circuit. This again divides equally between the two output circuits to supply $(N + 1)/2\ I_1$ to each, still insufficient to cause the output circuit to respond and provide a "1" output. The duration of the applied test signals is chosen to be of sufficient length that an input stream at an unselected input circuit will contain at least one "0" bit. The input streams generally have periodically recurring sync, framing, or error checking bits so the duration required for the test signal will be some reasonable multiple of the individual pulse duration. Crosses to other paths will then be detected when this "0" input occurs at the second input circuit.

The above description can be conveniently summarized in the following table showing the output detected for each of the malfunction types in response to binary "0" and binary "1" test signals applied at the selected input circuit:

| | Digital Input Applied | Digital Output Detected |
|---|---|---|
| Normal path | 0 | 0 |
| | 1 | 1 |
| Discontinuity | 0 | 0 |
| | 1 | 0 |
| Ground | 0 | 0 or 1 |
| | 1 | 0 or 1 |
| Cross | 0 | 0 |
| | 1 | 0 |

It readily can be seen that the path integrity can be checked by applying in sequence to the selected input circuit test inputs "0" and "1." The responses thereto observed at the connected output circuit will then indicate whether the path has been established properly. In this way the system control instrumentality can determine whether the selected path should be used for data transmission or whether network maintenance should be performed to further isolate the trouble.

Figure 2:
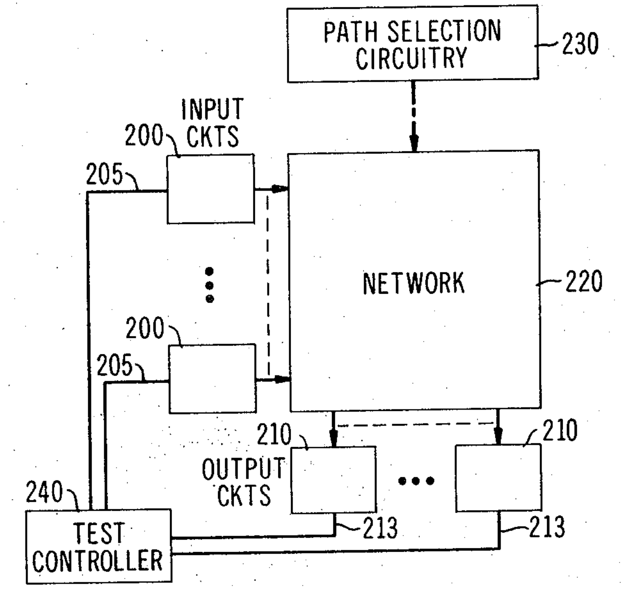
FIG. 2 depicts the arrangement of FIG. 1 with apparatus for testing the same, in accordance with my invention.

FIG. 2 depicts the communication arrangement of FIG. 1 along with a Test Controller 240 to generate the test inputs. The Test Controller 240 has access to all of the Input Circuits 200 via Control Lines 205 and to all of the Output Circuits 210 via Control Lines 213. After the Path Selection Circuitry 230 establishes a path through the Network 220, the test controller applies the necessary inputs to the selected input circuit and monitors the responses at the connected output circuit.

It is to be understood that the above-described arrangement is merely illustrative of the application of the principles of the invention; numerous other arrangements may be devised by those skilled in the art without departing from the spirit and scope of the invention.

What is claimed is:

1. A communication arrangement for a switching network which comprises a plurality of input terminals, a plurality of output terminals, a plurality of crosspoints defining a plurality of possible paths between said input and output terminals, and means for controlling said crosspoints for selectively establishing paths; said arrangement comprising:

a plurality of input circuits each connected to a corresponding one of said input terminals, said input circuits each comprising means responsive to two-valued input signals applied thereto for generating at said corresponding input terminals corresponding current signals of first and second predetermined magnitudes, said second predetermined magnitude being $N$ times said first predetermined magnitude, $N$ being greater than one and less than three, and a plurality of output circuits each connected to a corresponding one of said output terminals, said output circuits each comprising means for generating data output signals in response to current signals obtained from said connected output terminal exceeding a threshold level of X times said first predetermined magnitude, where $(N + 1)/2 \leq X < N$ for $1 < N \leq 2$, and $(N + 1)/2 \leq X < 2$ for $2 < N < 3$ whereby faults, e.g., open circuit conditions, cross to another path, or cross to a foreign potential, can be detected by sequentially applying said two-valued input signals to an input terminal and observing said current signals from an output terminal connected to said input terminal.

2. A communication arrangement for a switching network which comprises a plurality of input terminals, a plurality of output terminals, a plurality of crosspoints defining a plurality of possible paths between said input and output terminals, and means for controlling said crosspoints for selectively establishing paths; said arrangement comprising:

a plurality of input circuits each connected to a corresponding one of said input terminals, said input circuits each comprising a transistor having a base connected to a source of constant voltage, a collector connected directly to said corresponding input terminal, and an emitter connected to ground through a resistance which is varied in magnitude in response to two-valued input signals to establish collector currents of first and second predetermined magnitudes, said second predetermined magnitude being $N$ times said first predetermined magnitude, $N$ being greater than one and less than three, and a plurality of output circuits each connected to a corresponding one of said output terminals, said output circuits each comprising means for generating data output signals in response to current signals obtained from said connected output terminal exceeding a threshold level of X times said first predetermined magnitude, where $(N+1)/2 \leq X < N$ for $1 < N \leq 2$, and $(N+1)/2 \leq X < 2$ for $2 < N < 3$ whereby faults, e.g., open circuit conditions, cross to another path, or cross to a foreign potential, can be detected by sequentially applying said two-valued input signals to an input terminal and observing said current signals from an output terminal connected to said input terminal.

3. A communication arrangement in accordance with claim 2 wherein said resistance comprises at least two resistors in series, and at least one of said resistors is bypassed in response to one value of said two-valued input signals.

4. A communication arrangement in accordance with claim 3 wherein said bypassing of said resistor shunts, the emitter and collector of a transistor to the base, of which are applied two-valued input signals, only one of said values being of sufficient magnitude to cause saturation.

5. A communication arrangement in accordance with claim 2 wherein said output circuits each comprise a transistor having a base connected to a source of one constant voltage, a collector connected through a series resistor to a source of another constant voltage, and an emitter connected directly to said corresponding output terminal, and means connected to said transistor for detecting its saturated state.

6. A communication arrangement in accordance with claim 5 wherein said means for detecting comprises a differential comparator having first and second input terminals connected to the collector and the base of said output circuit transistor respectively.

7. An arrangement for testing a communication switching network which comprises a plurality of input terminals, a plurality of output terminals, a plurality of crosspoints defining a plurality of possible paths between said input and output terminals, and means for controlling said crosspoints for selectively establishing paths, comprising:

a plurality of input circuits each connected to a corresponding input terminal and comprising means responsive to two-valued input signals for applying corresponding current signals of first and second predetermined magnitudes to said corresponding input terminals, said second predetermined magnitude being $N$ times said first predetermined magnitude, $N$ being greater than one and less than three;

a plurality of output circuits each connected to a corresponding output terminal and comprising means for generating data output signals in response to current signals obtained from said connected output terminal exceeding a threshold level of X times said first predetermined magnitude where $(N+1)/2 \leq X < N$ for $1 < N \leq 2$, and $(N+1)/2 \leq X < 2$ for $2 < N < 3$, and test control means for applying test input signals to any selected one of said input terminals and means for simultaneously observing the resulting data output signals at the output circuit connected through said switching network to said selected input terminal.

8. An arrangement for testing a communication switching network which comprises a plurality of input terminals, a plurality of output terminals, a plurality of crosspoints defining a plurality of possible paths between said input and output terminals, and means for controlling said crosspoints for selectively establishing paths, comprising:

a plurality of input circuits each connected to a corresponding input terminal and comprising a first transistor having a base connected to a source of constant voltage, a collector connected directly to said corresponding input terminal, and an emitter connected to ground through at least two resistors in series, at least one of said resistors shunting the emitter and collector of a second transistor to the base of which are applied two-valued input signals, only one of said values being of sufficient magnitude to saturate said second transistor, to establish currents of first and second predetermined magnitudes in the collector of said first transistor, said second predetermined magnitude being $N$ times said first predetermined magnitude, $N$ being greater than one and less than three, a plurality of output circuits each connected to a corresponding output terminal and comprising a transistor having a base connected to a source of one constant voltage, a collector connected through a series resistor to a source of another constant voltage, an emitter connected directly to said corresponding output terminal, and which saturates when the collector current exceeds a threshold level of X times said first predetermined magnitude, where $(N+1)/2 < X \leq N$ for $1 < N \leq 2$, and $(N+1)/2 < X \leq 2$ for $2 < N < 3$; and a differential comparator having first and second input terminals connected to the collector and base of said transistor, respectively, and test control means for applying test input signals to any selected one of said input terminals and means for simultaneously observing the resulting data output signals at the output circuit connected through said switching network to said selected input terminal.

9. In combination:

transmitting means responsive to binary input signals applied thereto for generating current signals of first and second predetermined magnitudes to represent the binary states, said second predetermined magnitude being $N$ times said first predetermined magnitude, $N$ being greater than one and less than three, receiving means for generating output signals responsive to current signals exceeding a threshold level of X times said first predetermined magnitude where $(N+1)/2 \leq X < N$ for $1 < N \leq 2$, and $(N+1)/2 \leq X < 2$ for $2 < N < 3$, and means for selectively interconnecting one of a plurality of said transmitting means with one of a plurality of said receiving means whereby information may be transmitted from an input terminal to a connected output terminal and circuit faults, e.g., open circuit condition, cross to another circuit path, cross to a foreign potential, associated with a connection between an input terminal and an output terminal can be detected by applying sequences of binary input signals and observing signals at an output connected to said input terminal.

10. An electrical communications switching network comprising:

a plurality of input terminals, a plurality of output terminals, a plurality of semiconductor crosspoint elements defining a plurality of possible transmission paths therethrough, a bias current source associated with each of said input terminals, means for activating the crosspoint elements of a selected path between any selected input terminal and any selected output terminal, the associated current source establishing a bias current of a first predetermined magnitude for the crosspoint elements of said path, input circuit means associated with each of said input terminals and responsive to one value of two-valued input signals applied thereto for increasing said bias current to a second predetermined magnitude $N$ times that of said first predetermined magnitude, $N$ being greater than one and less than three, detection circuit means associated with each of said output terminals comprising a transistor having a collector connected through a resistor to a source of one constant voltage, an emitter connected directly to said output terminal, and a base connected to another source of constant voltage, and which saturates when the collector current exceeds a threshold level of X times said first predetermined magnitude where $(N+1)/2 \leq X < N$ for $1 < N \leq 2$, and $(N+1)/2 \leq X < 2$ for $2 < N < 3$, and means for detecting the saturated state of said transistor.

* * * * *